United States Patent
Yanase (10) Patent No.: US 8,512,909 B2
(45) Date of Patent: Aug. 20, 2013

(54) LAMINATED ELECTROLYTE MEMBRANE, METHOD OF PREPARING THE SAME, AND MEMBRANE ELECTRODE ASSEMBLY AND FUEL CELL INCLUDING THE LAMINATED ELECTROLYTE MEMBRANE

(75) Inventor: Satoshi Yanase, Yokohama (JP)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 510 days.

(21) Appl. No.: 12/539,102

(22) Filed: Aug. 11, 2009

(65) Prior Publication Data

US 2010/0040929 A1 Feb. 18, 2010

(30) Foreign Application Priority Data

Aug. 12, 2008 (JP) ................. 2008-207901
Nov. 26, 2008 (KR) ........... 10-2008-0118353

(51) Int. Cl.
*H01M 8/10* (2006.01)

(52) U.S. Cl.
USPC ............ 429/491; 429/492; 429/483; 521/27

(58) Field of Classification Search
USPC ......... 429/491, 492, 493, 494, 483; 204/295, 204/296; 521/27, 28, 30; 428/322.2, 320.2, 428/306.6
See application file for complete search history.

(56) References Cited

U.S. PATENT DOCUMENTS

| 5,525,436 A | 6/1996 | Sevinell et al. |
| 2004/0062969 A1* | 4/2004 | Sakaguchi et al. ............... 429/33 |
| 2005/0084727 A1 | 4/2005 | Kiefer et al. |

FOREIGN PATENT DOCUMENTS

| JP | 11-503262 | | 3/1999 |
| JP | 2004-83663 | | 3/2004 |
| JP | 2005-525683 | | 8/2005 |
| JP | 2005-527073 | | 9/2005 |
| JP | 2005-527075 | | 9/2005 |
| JP | 2005-527948 | | 9/2005 |
| JP | 2006-172765 | * | 6/2006 |
| JP | 2007-172929 | * | 7/2007 |
| JP | 2008-71575 | | 3/2008 |
| JP | 2008-507087 | | 3/2008 |
| WO | WO 03/075389 | | 9/2003 |
| WO | WO 03/092090 | | 11/2003 |
| WO | WO 03/096465 | | 11/2003 |
| WO | WO 2006/019508 | | 2/2006 |

* cited by examiner

*Primary Examiner* — Raymond Alejandro
(74) *Attorney, Agent, or Firm* — Stein IP, LLC (57) ABSTRACT

A laminated electrolyte membrane, a membrane electrode assembly including the laminated electrolyte membrane, and a method of preparing the laminated electrolyte membrane, the laminate electrolyte membrane comprising at least two polymer membranes that are laminated together, and an electrolytic polymer obtained by polymerizing a monomer having a polymerizable functional group and a proton dissociable functional group.

9 Claims, 4 Drawing Sheets

LAMINATED ELECTROLYTE MEMBRANE, METHOD OF PREPARING THE SAME, AND MEMBRANE ELECTRODE ASSEMBLY AND FUEL CELL INCLUDING THE LAMINATED ELECTROLYTE MEMBRANE

CROSS-REFERENCE TO RELATED APPLICATIONS

This application claims the benefit of Japanese Patent Application No. 2008-207901, filed on Aug. 12, 2008, in the Japanese Patent Office, and Korean Patent Application No. 10-2008-0118353, filed on Nov. 26, 2008, in the Korean Intellectual Property Office, the disclosures of which are incorporated herein, by reference.

BACKGROUND

1. Field

One or more embodiments relate to a laminated electrolyte membrane, a method of preparing the same, a membrane electrode assembly including the laminated electrolyte membrane, and a fuel cell including the membrane electrode assembly.

2. Description of the Related Art

Fuel cell systems that are operated at a temperature of 100° C., or more, in a non-humidified environment, can include an electrolyte membrane prepared by impregnating a basic structural polymer with an acid, as described in (Japanese Patent Application Laid-open No. hei 11-503262. As an example of the electrolyte membrane described above, an electrolyte membrane prepared by impregnating a polybenzimidazole film with sulphuric acid or phosphoric acid is disclosed in the art. Fuel cells using such electrolyte membranes effectively use generated heat, thereby having a higher energy efficiency than fuel cells that use an electrolyte membrane comprising a fluoropolymer, such as Nafion (Dupont Co.) that are operated at relatively lower temperatures of 80° C., or less.

However, in fuel cells using an acid-impregnated basic polymer membrane, acid leaks out of the electrolyte membrane during operation, and thus, the performance of the fuel cells deteriorates and the leaked acid can corrode adjacent elements. To address these problems, a method of reducing acid leakage from an electrolyte membrane, wherein the impregnated acid is polymerized in an electrolyte, to prepare an acidic polymer, is disclosed in Japanese Patent Application Laid-open No. hei 2005-527073.

However, according to Japanese Patent Application Laid-open No. hei 2005-527073, if an electrolyte membrane has defects therein, such as pin holes, the performance of a fuel cell including the electrolyte membrane is significantly reduced by the defective electrolyte membrane, rather than by the leakage of acid, and the fuel cell cannot be operated efficiently.

SUMMARY

One or more embodiments provided therein include a laminated electrolyte membrane for a fuel cell that is operated at a high temperature, in a non-humidified environment, a method of preparing the same, and a membrane electrode assembly including the laminated electrolyte membrane. The leakage of acid from the laminated electrolyte membrane is decreased, and the laminated electrolyte membrane maintains good performance, even if the laminated electrolyte membrane has defects therein.

According to various embodiments, provided is a laminated electrolyte membrane including at least two polymer membranes that are laminated together, each membrane including an electrolytic polymer obtained by polymerizing monomers that each have a polymerizable functional group and a proton-dissociable functional group. Accordingly, the leakage of acid from the laminated electrolyte membrane is decreased, and the durability thereof is increased.

According to various embodiments, the monomers may be independently selected from the group consisting of vinyl phosphonic acid, vinyl sulfonic acid, and 2-acrylamide-2-methyl propane sulfonic acid.

According to various embodiments, the polymer membranes may each comprise at least one structural polymer selected from the group consisting of polybenzimidazoles, poly(pyridines), poly(pyrimidines), polyimidazoles, polybenzthiazoles, polybenzoxazoles, polyoxadiazoles, polyquinolines, polyquinoxalines, polythiadiazoles, poly(tetrazapyrenes), polyoxazoles, polythiazoles, polyvinylpyridines, and polyvinylimidazoles.

According to various embodiments, the polymer membranes may each comprise a repeating unit represented by general formula A-1, A-2, or A-3, or combinations of at least two of these structural units:

wherein R1, R2, R3, R4, R5, and R6 are, each independently, a hydrogen atom, an alkyl group, an allyl group, a sulfonic acid group, a hydroxyl group, a nitro group, or an amino group, and n is an integer in the range of 10 to 10000. The alkyl group may have a carbon atom number of 1 to 10, for example, a carbon atom number of 1 to 7, or 1 to 5.

According to various embodiments, the electrolytic polymer may be crosslinked by a third component (crosslinking agent). The third component may comprise at least two polymerizable double bonds to introduce crosslinks into the electrolytic polymer.

According to various embodiments, the electrolytic polymer may be localized at the laminated interface between the polymer membranes.

According to various embodiments, a gap may not be substantially formed between the polymer membranes.

According to various embodiments, provided is a method of preparing a laminated electrolyte membrane, comprising: impregnating polymer membranes with a solution comprising a monomer having a polymerizable functional group and a proton dissociable functional group; laminating the polymer membranes together; and polymerizing the impregnated monomer.

According to various embodiments, provided is a membrane electrode assembly, comprising an oxygen electrode, a fuel electrode, and a laminated electrolyte membrane disposed therebetween. The laminated electrolyte membrane includes at least two polymer membranes, each comprising an electrolytic polymer obtained by polymerizing a monomer having a polymerizable functional group and a proton-dissociable functional group.

Additional aspects and/or advantages of the present teachings will be set forth in part in the description which follows and, in part, will be obvious from the description, or may be learned by practice of the present teachings.

BRIEF DESCRIPTION OF THE DRAWINGS

These and/or other aspects and advantages of the present teachings will become apparent and more readily appreciated from the following description of the exemplary embodiments, taken in conjunction with the accompanying drawings, of which.

DETAILED DESCRIPTION

Reference will now be made in detail to the exemplary embodiments of the present teachings, examples of which are illustrated in the accompanying drawings, wherein like reference numerals refer to the like elements throughout. The exemplary embodiments are described below, in order to explain the aspects of the present teachings, by referring to the figures.

According to an exemplary embodiment, a laminated electrolyte membrane including at least two polymer membranes is used as an electrolyte membrane in a fuel cell. Each of the polymer membranes is impregnated with an electrolytic polymer obtained by polymerizing a monomer having a polymerizable functional group and a proton-dissociable functional group. In the laminated electrolyte membrane, the acidic monomer, which is a proton conduction medium, is polymerized. Thus, the leakage of the acidic monomer from the electrolyte membrane is less than that of an electrolyte membrane in the related art, which is prepared by impregnating a basic polymer membrane with an acid. Accordingly, the performance of a fuel cell including such an electrolyte membrane is maintained, even if the membrane has defects, such as pin holes. This effect is due electrolyte membranes covering the defects of adjacent electrolyte membranes.

However, it has been considered that such technical features are difficult to achieve, due to the following two problems. First, when electrolyte membranes are laminated positional deviations may occur, if the interfacial adhesion therebetween is insufficient, and thus, various problems may occur in manufacturing processes. Second, if the total thickness of the electrolyte membranes increases after the lamination, the electric resistance thereof increases, resulting in reduced proton conductivity. However, the present inventors found that the present laminated electrolyte membrane addresses these two problems and/or other problems.

With regard to the interfacial adhesion in the laminated electrolyte membrane, it is found that by using the electrolytic polymer, the prepared laminated electrolyte membrane can have sufficient interfacial adhesion between the laminated electrolyte membranes, for practical use. The electrolyte membranes in the related art, which are prepared by impregnating a basic polymer with acid, have no such property. In addition, the increase in the electric resistance caused by an increase in the total thickness of the laminated electrolyte membrane, and the resulting reduction in proton conductivity, do not matter in practical use, so long as the laminated electrolyte membrane has the present structure. The laminated electrolyte membrane described above, a membrane electrode assembly using the same, and a method of preparing the laminated electrolyte membrane are obtained based on these facts.

Hereinafter, the laminated electrolyte membrane described above, the membrane electrode assembly using the same, and the method of preparing the laminated electrolyte membrane will be described in greater detail.

As recited above, the acidic monomer refers to a monomer having a polymerizable functional group and a proton-dissociable functional group. Herein, the polymerizable functional group refers to a functional group that forms a bond between atoms, by an addition polymerization reaction, or a condensation polymerization reaction, such as a double bond between carbon atoms, a triple bond between carbon atoms, a double bond between a nitrogen atom and a carbon atom, an epoxy ring, a hydroxyl group, a carboxyl group, an amino group, or an aldehyde group. In addition, the proton dissociable functional group refers to a functional group that is capable of dissociating a proton, such as a phosphonic acid group, a sulfonic acid group, a phosphoric acid group, a carboxylic acid group, or a hydroxyl group. Examples of the acidic monomer include vinyl phosphonic acid, vinyl sulfonic acid, and 2-acrylamide-2-methyl propane sulfonic acid.

These acidic monomers may be used alone or in combination, to form the electrolytic polymer.

Herein, the electrolytic polymer refers to a polymer formed by linking the acidic monomer, using the polymerizable functional groups. The electrolytic polymer thereby includes the proton-dissociable functional groups. For example, when the acidic monomer is vinyl phosphonic acid, the obtained electrolytic polymer is polyvinyl phosphonic acid. For example, when the acidic monomer is vinyl sulfonic acid, the obtained electrolytic polymer is polyvinyl sulfonic acid. For example, when the acidic monomer is 2-acrylamide-2-methyl propane sulfonic acid, the obtained electrolytic polymer is poly-2-acrylamide-2-methyl propane sulfonic acid. In addition, when different types of the acidic monomers are mixed, the obtained electrolytic polymer is a copolymer formed of the different acidic monomers.

Herein, each of the recited polymer membranes included in the laminated electrolyte membrane refers to a polymer membrane impregnated with the electrolytic polymer. More particularly, the electrolytic polymer can be disposed between polymer chains of a structural polymer used to form the basic structure of the polymer membrane. The electrolytic polymer can be disposed within pores formed by the structural polymer. The polymer membranes can also be referred to as impregnated membranes, impregnated polymer membranes, or electrolyte membranes.

The laminated electrolyte membrane can include any suitable number of the polymer membranes, which are laminated together. After lamination, the polymer membranes may or may not directly contact each other.

Figure 1:
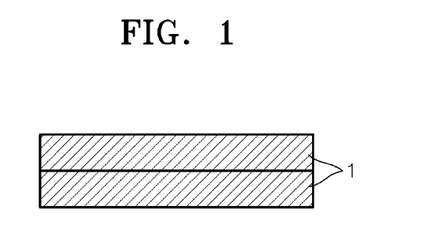
FIG. 1 is a diagram illustrating a lamination pattern of a laminated electrolyte membrane, according to an exemplary embodiment.
Figure 2:
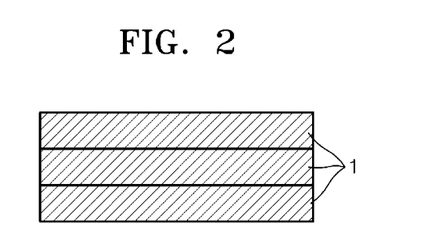
FIG. 2 is a diagram illustrating a lamination pattern of a laminated electrolyte membrane, according to another exemplary embodiment.
Figure 3:
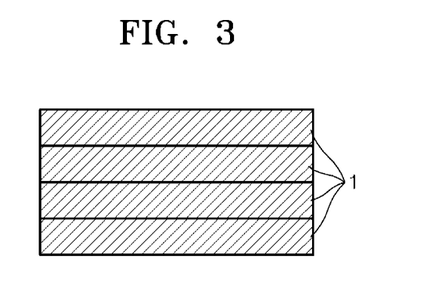
FIG. 3 is a diagram illustrating a lamination pattern of a laminated electrolyte membrane, according to another exemplary embodiment.

FIGS. 1 through 3 respectively illustrate laminated electrolyte membranes that respectively include two, three, and four polymer membranes 1, according to aspects of the present teachings. Each of the polymer membranes 1 directly contacts the polymer membrane(s) 1 adjacent thereto.

To enhance the interfacial adhesion between the polymer membranes, the electrolytic polymer may be localized between the polymer membranes. In more detail, the electrolytic polymer may be disposed in layers formed between the laminated polymer membranes. In this case, the layers may also include other components. However, if the amount of the electrolytic polymer is too small, the proton conductivity of such a laminated electrolyte membrane may be reduced. Therefore, in general, the amount of the polymer may be about 50 mass %, or more, based on the total mass of the laminated electrolyte membrane.

Figure 4:
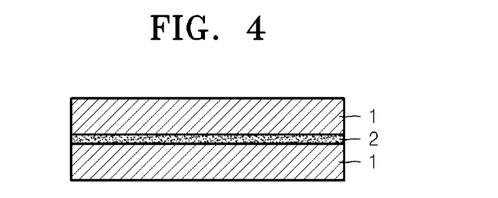
FIG. 4 is a diagram illustrating a lamination pattern of a laminated electrolyte membrane, according to another exemplary embodiment.
Figure 5:
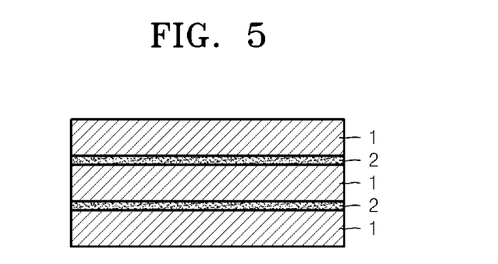
FIG. 5 is a diagram illustrating a lamination pattern of a laminated electrolyte membrane, according to another exemplary embodiment.
Figure 6:
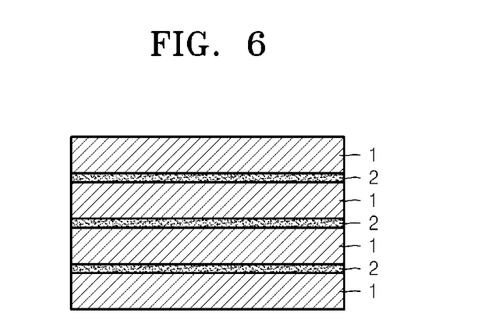
FIG. 6 is a diagram illustrating a lamination pattern of a laminated electrolyte membrane, according to another exemplary embodiment.

Examples of such laminated electrolyte membranes are shown in FIGS. 4 through 6. FIGS. 4 through 6 respectively illustrate laminated electrolyte membranes in which two, three, and four polymer membranes 1, and layers 2 of the electrolytic polymer formed between the polymer membranes 1. The thickness of the layers 2 is not particularly limited, but may be in the range of about 0.001 to 10 μm, and for example, in the range of about 0.1 to about 3 μm. When the thickness of the layers 2 is less than 0.001 μm, a sufficient adhesion between the polymer membranes 1 may be difficult to obtain. On the other hand, when the thickness of the layers 2 is greater than 10 μm, the total thickness of the laminated electrolyte membranes increases, and thus, the proton conductivity thereof may decrease. The presence of the layers 2 can be confirmed, by observing a cross-section of the laminated electrolyte membrane using an electron microscope.

According to various embodiments, provided is a laminated electrolyte membrane, in which a gap does not substantially exist between the laminated polymer membranes. That is, the interfacial adhesion of the laminated electrolyte membranes is very high. When a cross-section of the laminated electrolyte membrane is observed using an electron microscope, it can be confirmed that the gap does not exist between the polymer membranes.

Figure 9:
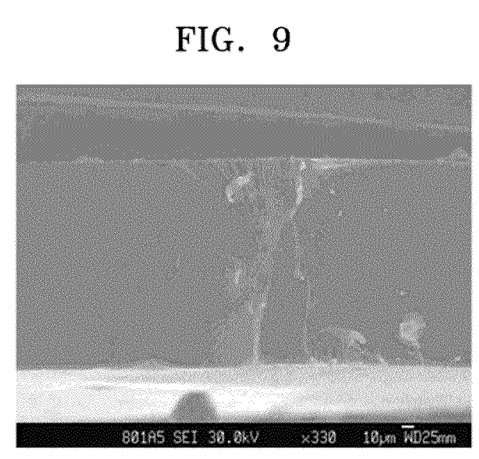
FIG. 9 is an electron microscopic image of a cross-section of a laminated electrolyte membrane, when a gap between laminated interfaces is not formed, according to an exemplary embodiment.
Figure 10:
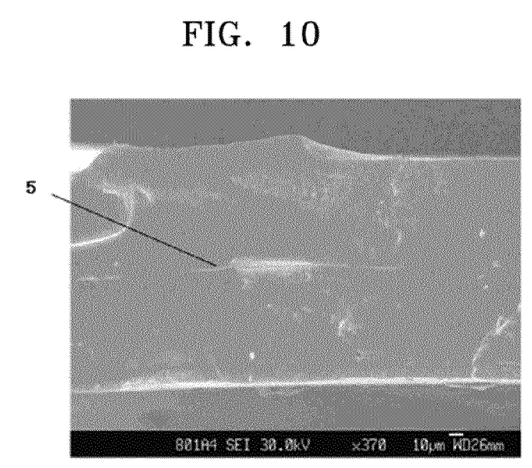
FIG. 10 is an electron microscopic image of a cross-section of a laminated electrolyte membrane, when a gap between laminated interfaces is formed, according to an exemplary embodiment.

FIGS. 9 and 10 are electron micrographs of cross-sections of laminated electrolyte membranes, according to various embodiments. Referring to FIG. 9, a gap is not substantially formed in the cross-section of the laminated electrolyte membrane. On the other hand, referring to FIG. 10, a gap 5 is formed in the cross-section of the laminated electrolyte membrane. Herein, a gap is referred to as substantially not existing, when a total cross-section of the laminated electrolyte membrane is photographed using an electron microscope, and a gap does not exist in a field of view of 50%, or more. When the laminated electrolyte membrane has such a structure, a layer of the electrolytic polymer is not observed between the laminated polymer membranes.

In each polymer membrane, the structural polymer can be in the form of a layer or film. The structural polymer can be selected from the group consisting of polybenzimidazoles, poly(pyridines), poly(pyrimidines), polyimidazoles, polybenzthiazoles, polybenzoxazoles, polyoxadiazoles, polyquinolines, polyquinoxalines, polythiadiazoles, poly(tetrazapyrenes), polyoxazoles, polythiazoles, polyvinylpyridines, and polyvinylimidazoles. In particular, the polymer may be polybenzimidazoles, polyimidazoles, polybenzthiazoles, polybenzoxazoles, polytriazoles, polyoxadiazoles, polythiadiazoles, polypyrazoles, polyquinoxalines, poly(pyridines), poly(pyrimidines), and poly(tetrazapyrenes). In particular, the structural polymer may include any one of the repeat units represented by general formulae A-1, A-2 and A-3 below:

In the general formulae A-1, A-2 and A-3, R1, R2, R3, R4, R5, and R6 are each independently selected from, a hydrogen atom, an alkyl group, an allyl group, a sulfonic acid group, a hydroxyl group, a nitro group, or an amino group, and n is an integer in the range of 10 to 10000. The alkyl group may have from 1 to 10 carbon atoms, for example, from 1 or 7, or from 1 to 5, carbon atoms. The alkyl group may be a methyl group, an ethyl group, an iso-propyl group, an n-propyl group, or the like.

The electrolytic polymer may be crosslinked using a third component (crosslinking agent). Due to the crosslinked structure of the electrolytic polymer, the obtained electrolyte membrane may have improved heat resistance. The third component may be a compound including at least two polymerizable double bonds. Examples of the compound include polyethyleneglycol dimethacrylate, ethyleneglycol dimethacrylate, N,N'-methylenebisacrylamide, ethylene diacrylate, polyethyleneglycol diacylate, allyl methacylate, diethyleneglycol dimethacrylate, triethyleneglycol dimethacrylate, tetraethyleneglycol dimethacrylate, 1,3-butanediol dimethacrylate, glycerine dimethacrylate, diurethane dimethacrylate, trimethylpropane trimethacrylate, epoxy acrylate, such as ebacryl, carbinol, butadiene, isoprene, chloroprene, divinylbenzene, bisphenol A dimethylacrylate, divinyl sulfone, and diethyleneglycol divinyl ether. These compounds may be used alone or in combination.

The laminated electrolyte membrane may be prepared using a number of different methods. In a first method, the polymer membranes are impregnated with a solution including the acidic monomer (acidic monomer solution). The polymer membranes are laminated together. Then the acidic monomer is polymerized, to obtain a laminated electrolyte membrane.

In a second method, the polymer membranes are impregnated with the acidic monomer solution, and the acidic monomer is polymerized, to prepare polymer membranes including the electrolytic polymer (single-layered electrolyte membranes). Then, the single-layered electrolyte membranes are laminated, to obtain a laminated electrolyte membrane.

In a third method, the polymer membranes are laminated and then impregnated with the acidic monomer solution. The acidic monomer is then polymerized, to obtain a laminated electrolyte membrane.

In the laminated electrolyte membranes prepared using the first or third methods, the electrolytic polymer is assumed to be localized between the laminated polymer membranes, because the polymer membranes are laminated before the monomer is polymerized. Thus, the acidic monomer solution forms layers between the polymer membranes, and when polymerized.

However, in the third method, when the laminated polymer membranes are impregnated with the acidic monomer solution, the position deviation of the laminated polymer membranes may occur. Therefore, in most cases, the first or second methods may produce better results.

The acidic monomer solution may include a crosslinking agent. The amount of the crosslinking agent may be in the range of from about 0.1 to about 50 mass %, and for example, in the range of about 1 to about 30 mass %. The acidic monomer solution may include, as an additive, a solvent such as water, in order to adjust the viscosity of the solution.

As a method of impregnating the polymer membrane with the acidic monomer solution, the polymer membrane may be immersed in the acidic monomer solution. To terminate the impregnating process within a shorter period of time, the impregnating process may be performed at a temperature in the range of from about 40 to about 70° C.

The acidic monomer may be polymerized using any suitable method, such as, by heating, or by irradiation with ultraviolet rays, electron rays, or γ-rays. In the heating method, the polymer membrane impregnated with the acidic monomer solution is heated in an oven. The heating temperature and heating time may be adjusted, by checking the properties of the obtained laminated electrolyte membrane. In this regard, a polymerization initiator, for example, 2,2'-azobis(2-methylpropionamidine)dihydrochloride, or 2,2'-azobisisobutyronitrile, is added to the acidic monomer solution. In the irradiation methods, the polymer membrane impregnated with the acidic monomer solution is irradiated with ultraviolet rays, electron rays, or γ-rays. The irradiation intensity and time may be adjusted, by checking the properties of the obtained electrolyte membrane.

Figure 7:
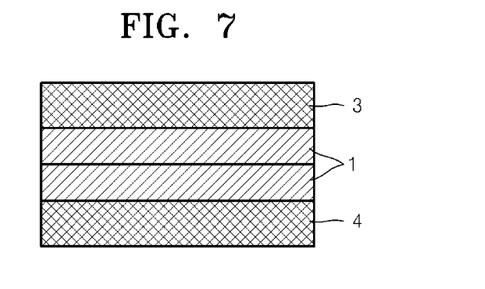
FIG. 7 is a diagram illustrating a structure of a membrane electrode assembly, according to an embodiment.
Figure 8:
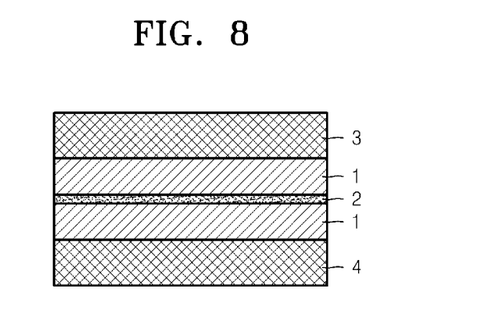
FIG. 8 is a diagram illustrating a structure of a membrane electrode assembly, according to another exemplary embodiment.

FIGS. 7 and 8 illustrate membrane electrode assemblies, according to various embodiments of the present teachings. Referring to FIG. 7, the membrane electrode assembly includes the laminated electrode assembly of FIG. 1, disposed between a cathode 3 (oxygen electrode) and an anode 4 (fuel electrode). Referring to FIG. 8, the membrane electrode assembly includes the laminated electrode assembly of FIG. 4, disposed between the cathode 3 and the anode 4.

As a method of fabricating the membrane electrode assemblies, the laminated electrolyte membranes may be sandwiched between the cathodes 3 and the anodes 4. To increase the adhesion therebetween, the membrane electrode assemblies may be pressed together widthwise.

Hereinafter, one or more embodiments will be described in greater detail with reference to the following examples.

Example 1

Vinyl phosphonic acid (manufactured by Tokyo Chemical Industry) was used as the acidic monomer, polyethyleneglycol dimethacrylate (manufactured by Aldrich) was used as a third component (crosslinking agent), a 1 mass % aqueous solution of 2,2'-azobis(2-methylpropionamidine)dihydrochloride (obtained by dissolving 2,2'-azobis(2-methylpropionamidine manufactured by Wako Pure Chemical Industries, Ltd., in pure water) was used as a polymerization initiator. The above components were mixed in water, a weight ratio of 100:5:5:20, to prepare an acidic monomer solution. A polybenzimidazole membrane having a thickness of 40 μm and having a repeat unit represented by general formula A-1, in which R1 to R5 are all hydrogen atoms, was prepared as a polymer membrane. The polymer membrane was cut into 2 cm×2 cm squares. Then the obtained polymer membranes were impregnated with the acidic monomer solution at about 40° C., for 24 hours, to form impregnated membranes. The impregnated membranes were taken out of the acidic monomer solution, and then the excess acidic monomer solution was wiped away. Two of the impregnated membranes were then laminated together. Then, the laminated membranes were heat treated at about 80° C., for 3 hours, to obtain a laminated electrolyte membrane. The thickness of the laminated electrolyte membrane was 180 μm. An impregnation rate of the acidic monomer solution was 357%, as calculated using Equation (1) below.

$$\text{Impregnation rate}(\%) = (\text{weight of laminated electrolyte membrane} - \text{weight of polymer membrane before impregnation}) \times 100 / (\text{weight of polymer membrane before impregnation}) \quad \text{Equation (1)}.$$

Measurement of Proton Conductivity

The proton conductivity of the laminated electrolyte membrane was measured to be $6.8 \times 10^{-3}$ S/cm, using an AC impedance method.

Evaluation of Adhesion at the Laminated Interface

To evaluate the adhesion at the interface in the laminated electrolyte membrane obtained, front and rear surfaces of the laminated electrolyte membrane were inserted between fingers, and then a force was applied along the direction of deviation of the polymer membranes, to align the polymer membranes. The two polymer membranes were not separated, indicating good adhesion therebetween.

Evaluation of Leakage Rate of Acid Component

To evaluate the leakage of the acid component included in the laminated electrolyte membrane (polyvinylphosphonic acid of Example 1), the laminated electrolyte membrane was weighed and then sandwiched between Teflon (Dupont Co.) sheets. Then, the resultant product was pressed in a thickness direction at 25° C., at a pressure of 1 ton/cm$^2$, for 1 minute.

The acid component that leaked out and the weight of the laminated electrolyte membrane after the treatment were measured. The leakage rate of the acid component was measured to be 0%, using Equation (2) below.

Leakage rate(%)=(1−(weight of laminated electrolyte membrane before treatment-weight of laminated electrolyte membrane after treatment)/(weight of laminated electrolyte membrane before treatment-weight of polymer membrane before impregnation))×100    Equation (2)

Examples 2-5

Laminated electrolyte membranes were prepared in the same manner as in Example 1, except that the types of the acidic monomer and third component (crosslinking agent) were changed. The resulting laminated electrolyte membranes were evaluated, and the results are shown in Table 1 below.

Examples 6-7

Laminated electrolyte membranes were prepared in the same manner as in Example 1, except that the resulting laminated polymer membranes included different numbers of the polymer membranes. The resulting laminated electrolyte membranes were evaluated, and the results are shown in Table 2 below.

Example 8

Preparation and Evaluation of Membrane Electrode Assembly

A laminated electrolyte membrane was prepared in the same manner as in Example 1, except that 10 holes (pin holes) were formed in one of the two impregnated membranes, using an injection needle. The laminated electrolyte membrane was sandwiched between a commercially available cathode and an anode (manufactured by Electrochem), to prepare a membrane electrode assembly. The electrode assembly was operated in a fuel cell, at 150° C., in a non-humidified environment, with hydrogen supplied at 100 ml/min and oxygen supplied at 200 ml/min. The power generation characteristics (open-circuit voltage) thereof were then measured. The open-circuit voltage immediately after the measurement began was 0.95 V, which did not change after 30 days.

COMPARATIVE EXAMPLE 1

One of the impregnated membranes of Example 1 was heat treated at 80° C., for 3 hours, to obtain a single electrolyte membrane, which was not laminated. The single impregnated membrane was evaluated using the same method as in Example 1. The results are shown in Table 1 below.

COMPARATIVE EXAMPLE 2

A laminated electrolyte membrane was prepared in the same manner as in Example 1, except that an aqueous 85 mass % phosphoric acid solution (manufactured by Kishida Chemistry Co., Ltd.) was used as the acidic monomer solution. The resulting laminated electrolyte membrane was evaluated, and the results are shown in Table 1 below.

COMPARATIVE EXAMPLE 3

A perforated polymer membrane was prepared as in Example 8. The perforated membrane was included in electrode assembly and tested, in the same manner as in Example 1. The open-circuit voltage immediately after the measurement began was 0.90 V, which decreased to 0.80 V after 30 days.

Comparison Between Evaluation Results

The laminated electrolyte membranes prepared in Examples 1 through 7 had excellent proton conductivity, excellent interfacial adhesion, and no leakage of acid components. The laminated electrolyte membranes prepared in Examples 1, 6, and 7 were compared with the electrolyte membrane prepared in Comparative Example 1. Although the laminated electrolyte membranes of Examples 1, 6, and 7 had a greater membrane thickness than the electrolyte membrane of Comparative Example 1, they had higher proton conductivities. Thus, although the laminated electrolyte membranes of Examples 1, 6, and 7 had a laminated structure, thereby a greater thickness than the electrolyte membrane of Comparative Example 1, the performance of the laminated electrolyte membranes of Examples 1, 6, and 7 was not reduced.

The laminated electrolyte membrane prepared in Example 1 was compared with the electrolyte membrane of Comparative Example 2. The laminated electrolyte membrane of Example 1 had better adhesion at the laminated interface and better acid leakage characteristics.

The laminated electrolyte membrane prepared in Example 8 was compared with the laminated electrolyte membrane prepared in Comparative Example 3, in terms of effects of the laminated electrolyte membranes in the membrane electrode assemblies. Although one of the impregnated membranes in Example 8 was perforated, the power generation characteristics of the laminated electrolyte membrane of Example 8 were still good.

TABLE 1

|  | Monomer | Third component | Membrane thickness (μm) | Impregnation rate (%) | Proton Conductivity (mS/cm) | Evaluation result of Interfacial adhesion | Leakage rate (%) |
|---|---|---|---|---|---|---|---|
| Ex. 1 | Vinyl phosphonic acid | PEGDM | 180 | 357 | 6.8 | Good | 0 |
| Ex. 2 | Vinyl phosphonic acid | EGDM | 177 | 350 | 5.5 | Good | 0 |
| Ex. 3 | Vinyl phosphonic acid | NNMBA | 166 | 320 | 7.1 | Good | 0 |

TABLE 1-continued

| | Monomer | Third component | Membrane thickness (μm) | Impregnation rate (%) | Proton Conductivity (mS/cm) | Evaluation result of Interfacial adhesion | Leakage rate (%) |
|---|---|---|---|---|---|---|---|
| Ex. 4[1)] | Vinyl sulfonic acid/vinyl phosphonic acid | PEGDM | 181 | 370 | 4.5 | Good | 0 |
| Ex. 5 | 2-acrylamide-2-propane sulfonic acid | PEGDM | 190 | 380 | 5.0 | Good | 0 |
| Com. Ex. 1 | Vinyl phosphonic acid | PEGDM | 95 | 380 | 5.1 | — | 0 |
| Com. Ex. 2 | Aqueous 85% phosphoric acid solution | — | 190 | 376 | 8.0 | Peeled | 35 |

[1)]As a monomer, vinyl sulfonic acid and vinyl phosphonic acid are mixed in a weight ratio of 1:1.
2) PEGDM: polyethyleneglycol dimethacrylate
EGDM: Ethyleneglycol dimethacrylate
NNMBA: N,N'-methylenebisacrylamide

TABLE 2

| | Lamination number | Membrane thickness (μm) | Impregnation rate (%) | Proton Conductivity (mS/cm) | Evaluation result of interfacial adhesion | Leakage rate (%) |
|---|---|---|---|---|---|---|
| Ex. 1 | 2 | 180 | 357 | 6.8 | Good | 0 |
| Ex. 6 | 3 | 252 | 350 | 7.9 | Good | 0 |
| Ex. 7 | 4 | 345 | 320 | 8.2 | Good | 0 |

According to the one or more of the above exemplary embodiments, provided are a laminated electrolyte membrane, a method of preparing the same, and a membrane electrode assembly including the laminated electrolyte membrane. The membrane electrode assembly can be included in a fuel cell that is operated at a high temperature, in a non-humidified environment. Even if the laminated electrolyte membrane has defects therein, a rapid reduction in the performance of the fuel cell is prevented. In addition, although the laminated electrolyte membrane has a greater thickness than that of a conventional electrolyte membrane in order to increase durability, the laminated electrolyte membrane is highly conductive. Therefore, the laminated electrolyte membrane improves the durability of the fuel cell.

Although a few exemplary embodiments of the present teachings have been shown and described, it would be appreciated by those skilled in the art that changes may be made in these exemplary embodiments, without departing from the principles and spirit of the present teachings, the scope of which is defined in the claims and their equivalents.

What is claimed is:

1. A laminated electrolyte membrane comprising:
polymer membranes that are laminated together; and
an electrolytic polymer disposed within pores of the polymer membranes,
wherein the electrolytic polymer is a polymer of at least one monomer that is selected from the group consisting of vinyl phosphonic acid, vinyl sulfonic acid, and 2-acrylamide-2-methyl propane sulfonic acid,
each of the polymer membranes comprises a polybenzimidazole,
the electrolytic polymer forms at least one layer disposed between adjacent ones of the polymer membranes, the thickness of the layer being in the range of 0.001 to 10 μm, and the amount of the electrolytic polymer is 50 mass % or more, based on the total mass of the laminated electrolyte membrane.

2. The laminated electrolyte membrane of claim 1, wherein the polybenzimidazole is a structural polymer comprising repeating units independently selected from the following formula A-1, A-2, and A-3:

wherein R1, R2, R3, R4, R5, and R6 are each independently selected from a hydrogen atom, an alkyl group, an allyl group, a sulfonic acid group, a hydroxyl group, a nitro group, and an amino group, and n is an integer in the range of from 10 to 10000.

3. The laminated electrolyte membrane of claim 1, wherein the electrolytic polymer is crosslinked by a crosslinking agent.

4. The laminated electrolyte membrane of claim 3, wherein the crosslinking agent comprises at least two polymerizable double bonds.

5. The laminated electrolyte membrane of claim 1, wherein a gap is not substantially formed between adjacent ones of the polymer membranes.

6. A membrane electrode assembly comprising:
   an oxygen electrode;
   a fuel electrode; and
   the laminated electrolyte membrane of claim 1 disposed therebetween.

7. A fuel cell comprising the membrane electrode assembly of claim 6.

8. A membrane electrode assembly comprising:
   an oxygen electrode;
   a fuel electrode; and
   the laminated electrolyte membrane of claim 5 disposed therebetween.

9. A fuel cell comprising the membrane electrode assembly of claim 8.

* * * * *